(12) United States Patent
Nequist et al.

(10) Patent No.: US 7,590,955 B1
(45) Date of Patent: Sep. 15, 2009

(54) METHOD AND SYSTEM FOR IMPLEMENTING LAYOUT, PLACEMENT, AND ROUTING WITH MERGED SHAPES

(75) Inventors: Eric Nequist, Monte Sereno, CA (US); Richard Brashears, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 145 days.

(21) Appl. No.: 11/648,151

(22) Filed: Dec. 29, 2006

Related U.S. Application Data

(60) Provisional application No. 60/817,602, filed on Jun. 28, 2006.

(51) Int. Cl.
*G06F 17/50* (2006.01)

(52) U.S. Cl. .................... 716/4; 716/1; 716/2; 716/11

(58) Field of Classification Search ............... 716/1, 716/2, 4, 11
See application file for complete search history.

(56) References Cited

U.S. PATENT DOCUMENTS

| 5,535,134 A | * | 7/1996 | Cohn et al. | 716/8 |
| 6,209,123 B1 | * | 3/2001 | Maziasz et al. | 716/14 |

* cited by examiner

*Primary Examiner*—Thuan Do
(74) *Attorney, Agent, or Firm*—Vista IP Law Group, LLP.

(57) ABSTRACT

Disclosed is an improved method, system, and computer program product for performing layout, placement, and routing for electronic designs. According to some approaches, multiple objects are considered as a collective object or shape, based upon the proximity of one or more of the objects to one or more other objects. The type and/or configuration of the collective object is based, for example, upon the type of rule that is being considered for the layout, placement, or routing operation.

26 Claims, 17 Drawing Sheets

METHOD AND SYSTEM FOR IMPLEMENTING LAYOUT, PLACEMENT, AND ROUTING WITH MERGED SHAPES

CROSS-REFERENCE TO RELATED APPLICATIONS

The present application claims the benefit of U.S. Provisional Application No. 60/817,602, filed on Jun. 28, 2006, which is hereby incorporated by reference in its entirety.

BACKGROUND AND SUMMARY

A semiconductor integrated circuit (IC) has a large number of electronic components, such as transistors, logic gates, diodes, wires, etc., that are fabricated by forming layers of different materials and of different geometric shapes on various regions of a silicon wafer.

Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may uses a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters.

Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist.

Based upon this geometric information, photomasks are created for lithographic manufacturing of the electronic product. A photomask, or more simply a "mask," provides the master image of one layer of a given integrated chip's physical geometries. A typical photolithography system projects UV light energy on to and through the mask in order to transmit the mask pattern in reduced size to the wafer surface, where it interacts with a photosensitive coating on the wafer.

The manufacturability of modern IC designs using conventional optical lithography technology is increasingly being challenged by the sub wavelength, or low-k1, dimensions of the critical IC feature geometries. Not only are the critical dimension feature geometries decreasing in size in accordance with, or even faster than, Moore's Law predictions, the already large number of these feature geometries is growing at a dramatic rate as well. Furthermore, due to the necessity to mitigate optical proximity effect distortions through resolution enhancement techniques at the mask level, the overall polygonal figure count is skyrocketing. These critical feature geometries are patterned far more precisely as well due to the severity and sensitivity of the non-linear imaging. Extreme precision is required for sub wavelength, or low-k1, applications due to highly non-linear imaging behaviors which often magnify mask errors by large factors and non-intuitive manners.

In deep submicron design, a significant amount of time and effort is usually spent dealing with design manufacturability rules. The problem is that conventional approaches for handling design rules tend to break down when handling deep submicron designs.

For example, during the placement and routing process, conventional routers only act and analyze routes based upon individual objects in the layout. Each separate object in the layout would be individually considered by the router as it decides the best route to and through these objects. This is true for conventional routers, regardless of whether the router is a gridded or gridless router.

The present invention is directed to an improved method, system, and computer program product for performing layout, placement, and routing for electronic designs. According to some embodiments, multiple objects are considered as a collective object or shape, based upon the proximity of one or more of the objects to one or more other objects. The type and/or configuration of the collective object is based, for example, upon the type of rule that is being considered for the layout, placement, or routing operation. Other and additional objects, features, and advantages of the invention are described in the detailed description, figures, and claims.

DETAILED DESCRIPTION

The present invention is directed to an improved method, system, and computer program product for performing layout, placement, and/or routing for electronic designs. As noted above, conventional systems separately and individually consider existing objects in the layout when determining the appropriate location and/or configuration of polygons to place or route in the design.

According to some embodiments of the invention, multiple objects, or even relevant portions of those objects, are considered together as a collective object or shape. The collective object or shape is then considered when analyzing design rules for placement of other objects in the layout.

Figure 1:
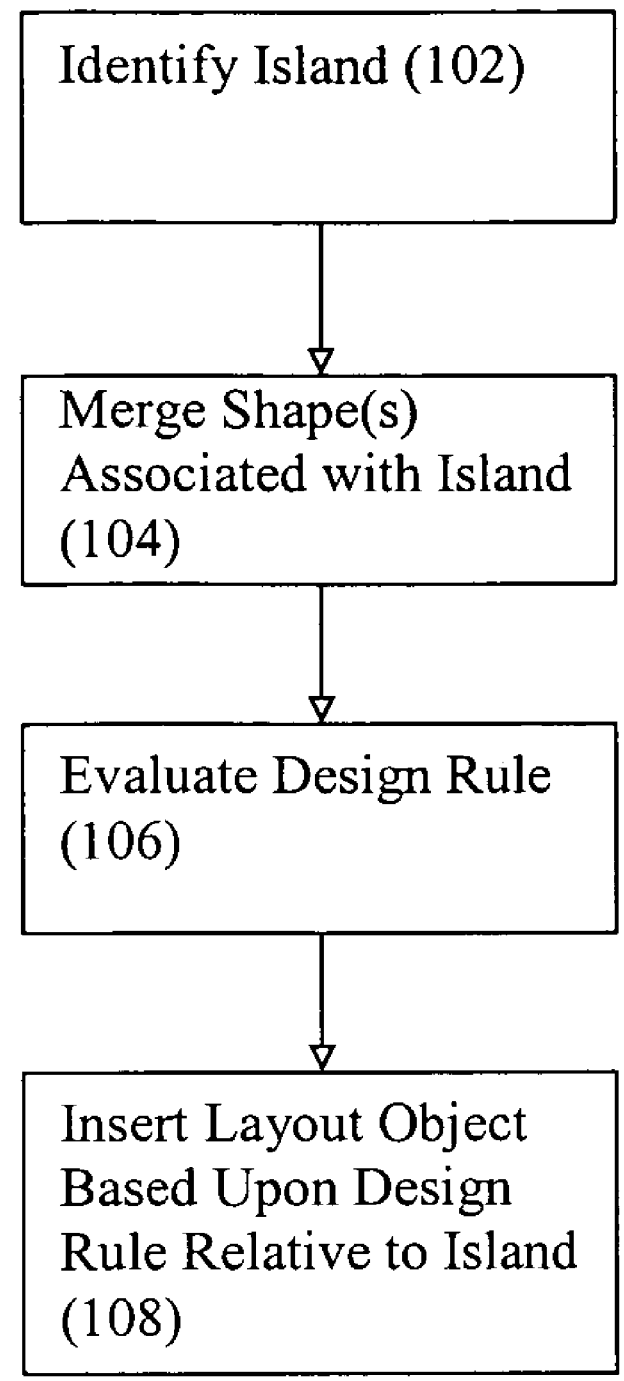
FIG. 1 shows a flowchart of a process for performing layout, placement, and/or routing with merged shapes according to some embodiments of the invention.

FIG. 1 shows a high level flowchart of a process for performing layout, placement, and/or routing according to an embodiment of the invention. One or more "islands" are formed based upon the proximity of one or more of the objects relative to one or more other objects (102). An island refers to a set of objects which are to be collected together and analyzed as a group or collective whole. In some embodiments, an object belongs to an island with another object if they short together on the same layer of the IC design, whether directly or indirectly.

The shapes identified with a given island are then merged together into a collective object or object portions for analysis (104). The collective object is then analyzed relative to design rules to determine appropriate layout configuration for other objects on the layout (106). The analysis may also focus on the appropriate layout configuration for the collective object (and its constituent parts) as well. The type and/or configuration of the merger approach for the collective object is based, for example, upon the type of rule that is being considered for the layout, placement, or routing operation. For example, the collective merger and subsequent analysis that is performed for an island for width-based design rules may differ from the collective merger and subsequent analysis that is performed for edge-based design rules.

The layout objects are then inserted into the design based upon the analysis of the collective object relative to the appropriate design rules (108).

Figure 2:
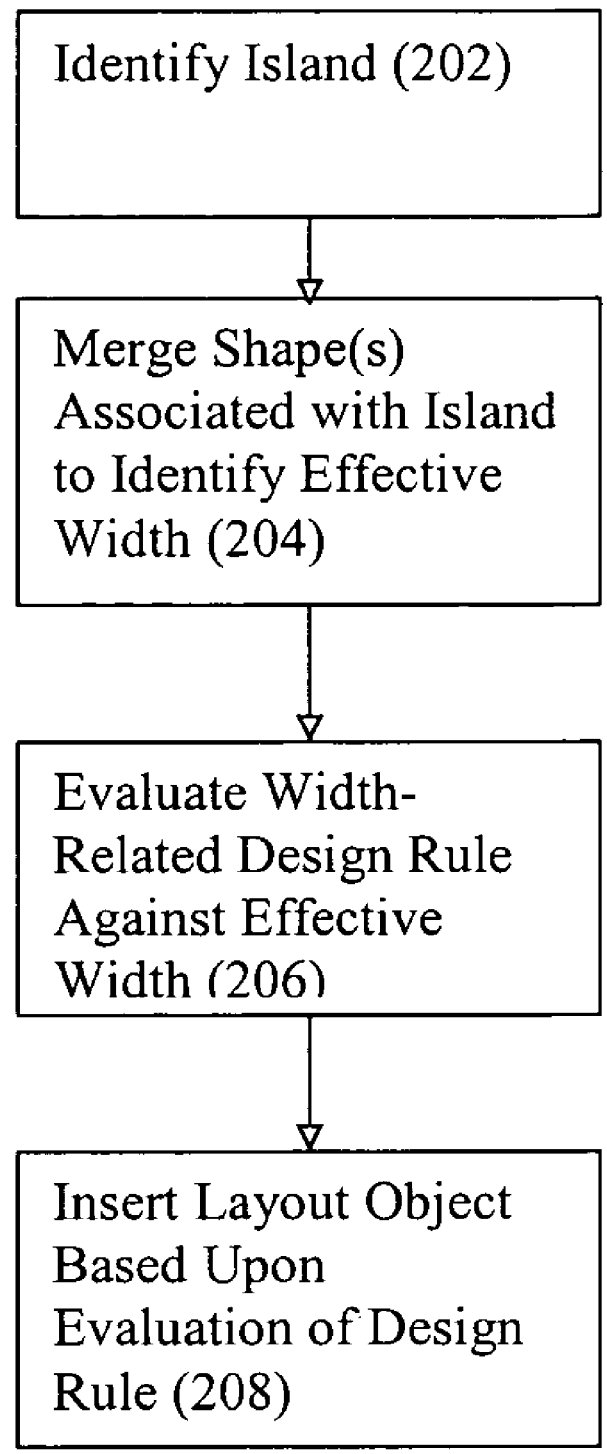
FIG. 2 shows a flowchart of a process for performing layout, placement, and/or routing with merged shapes for width-based rules according to some embodiments of the invention.

As noted above, the specific merger and analysis approach that is performed is dependent upon the type of design rules that is being analyzed. As an illustrative example, FIG. 2 shows a flowchart of a process for handling width-based rules. Examples of width-based design rules include width-based spacing rules and step edge rules. As before, an initial action is to identify one or more islands that need to be analyzed (202).

The next action is to merge the objects within the island in a manner that facilitates analysis of an effective width(s) for those objects in the island (204). The effective width(s) are determined for each orientation relative to the collective object from which another layout object may be placed. In some embodiments, horizontal and/or vertical effective widths are determined for the collective object. Any suitable approach may be performed to identify the effective widths within the scope of the invention.

The width-based spacing rules are evaluated against the effective width(s) to perform the layout analysis (206). This action may be taken for either or both placement as well as routing objects that need to be inserted into an IC design. This action identifies the type, size, configuration, and/or geometric placement of objects in the layout based upon analysis of the width-based spacing rules. In essence, analysis is performed to ensure that the newly placed object will not violate a width-based rule relative to the collective object. Thereafter, the layout object is inserted into the design in a manner that does not violate the width-based design rules relative to the collective object (208).

Figure 3:
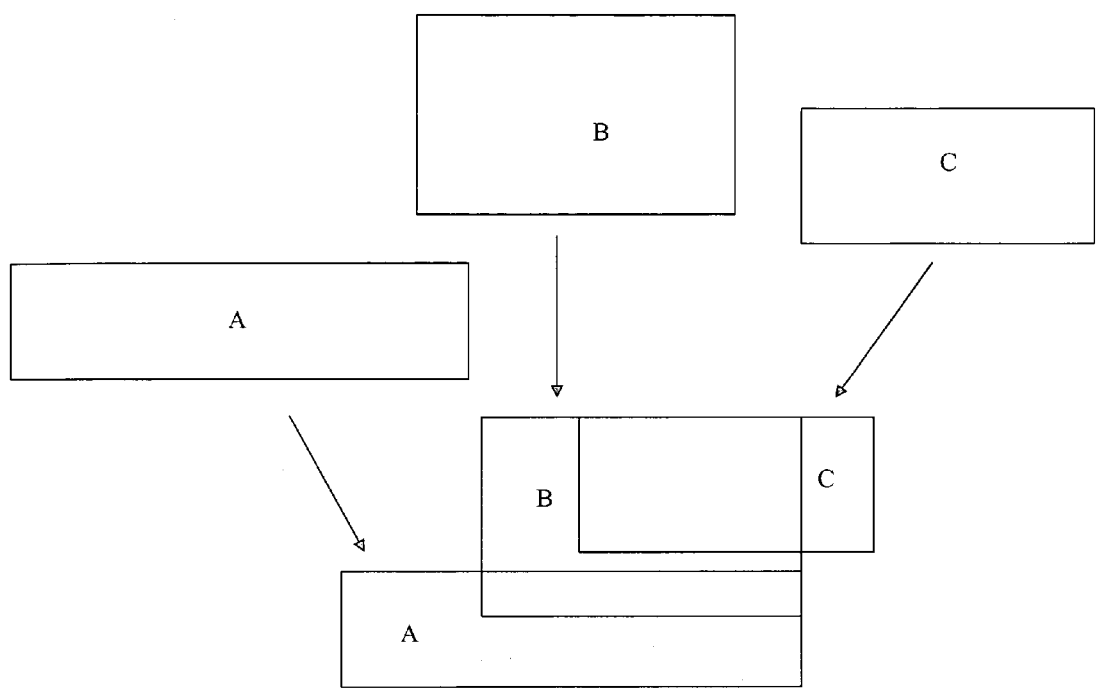
FIG. 3 illustrates a configuration of layout objects.

To illustrate this embodiment of the invention, consider the configuration of objects shown in FIG. 3. This figure illustrates three rectangular objects (object A, object B, and object C). Assume that these objects are configured in the layout such that they overlap as shown in FIG. 3. Further assume that it is desired to place another object spaced apart from these objects and just vertical above object B.

The initial action is to identify an island of objects that should be analyzed as a collective group. Assume that the criteria for determining an island is based upon the identifying the objects that short together on a single layer, whether directly or indirectly through other objects. Here, the island consists of all three objects—object A, object B, and object C—since all three objects short together.

Figure 4A:
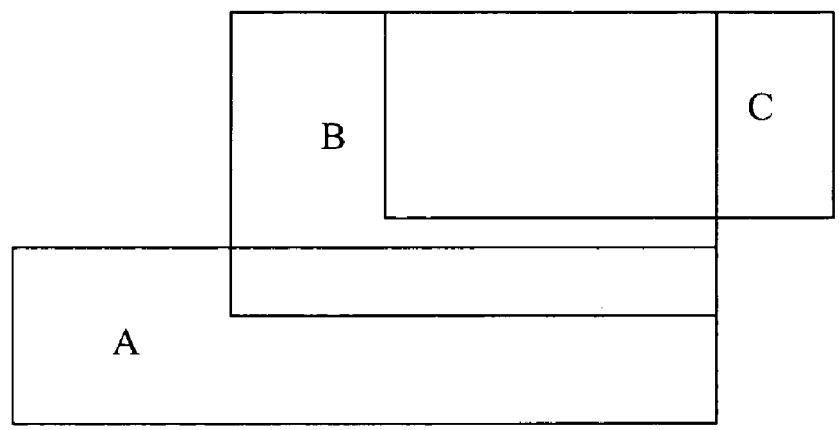
FIGS. 4A-D illustrate an application of one embodiment of the invention to the configuration of FIG. 3.
Figure 4A:
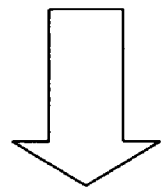
Figure 4A:
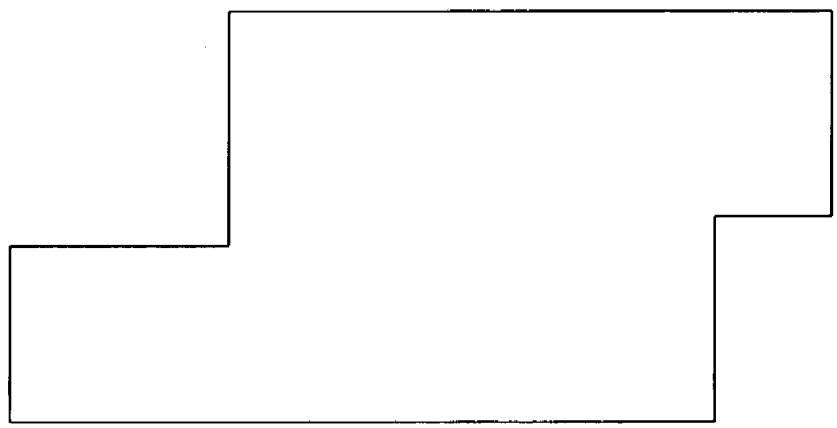

The next action is to merge the objects in the island together. As shown in FIG. 4A, one approach for merging the objects together is to perform a geometric Boolean OR operation upon the objects.

The next action is to determine the effective width of the object relative to the intended width-based spacing rule and with respect to the appropriate orientation for the intended object to be placed in the layout. In this illustrative example, the process would be used to identify the effective vertical width of the collective object.

Figure 4B:
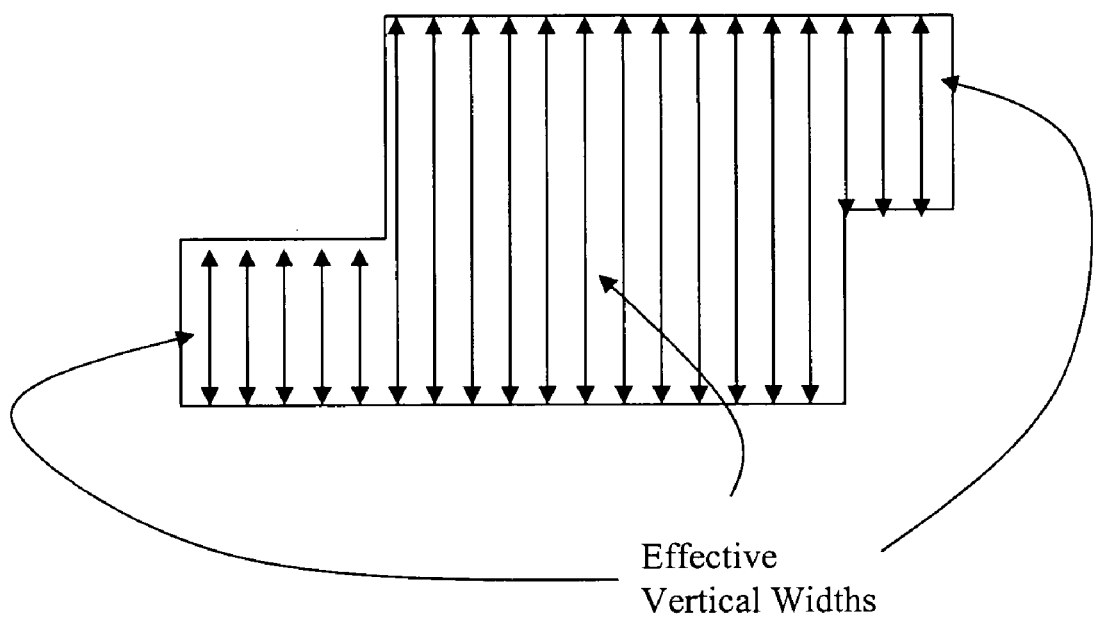

Referring to FIG. 4B, one approach for determining the vertical effective width is to perform scanline processing, which scans across the entire collective object from one side to the other. The scanline processing identifies the width of the entire collective object at each point of the scan. In this manner, the effective vertical width of every point along the collective object can be identified. As can be seen in FIG. 4B, the collective object is configured such that there are only three different vertical widths in the collective object.

The next action is to analyze the effective width value(s) relative the appropriate width-based rules to determine the proper and legal configuration for the object to be inserted into the layout. For example, a width-based spacing rule is a common example of a width-based design rule. The width-based spacing rules specifies the minimum spacing that must exist between two objects in the layout based upon the widths of one or both of the objects. Generally, the larger the widths of the objects, the larger is the required minimum spacing between the two objects.

Figure 4C:
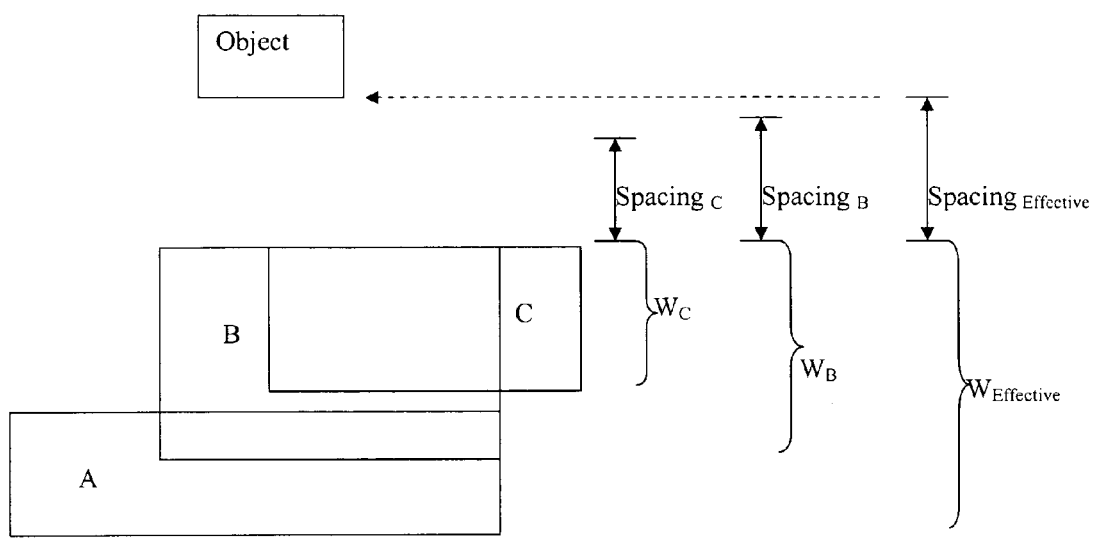

This type of analysis for a width-based spacing rule is graphically shown in FIG. 4C. The effective vertical width relative to the location for the placement of the newly inserted Object is $W_{effective}$. Based upon the width-based spacing rule, the minimum spacing requirement between the Object and the collective whole of objects A, B, and C is $Spacing_{efffecitve}$.

It is noted that if the analysis is performed against each of the objects A, B, and C individually, then a different result occurs. To explain, consider the actual widths of objects B and C, which are shown in FIG. 4C as $W_B$ and $W_C$, respectively. It is noted that both of these actual widths $W_B$ and $W_C$ for objects B and C are smaller than the effective width $W_{effective}$ of the collective objects. Therefore, the minimum spacing requirements $Spacing_B$ and $Spacing_C$ for these actual widths $W_B$ and $W_C$ are smaller than the minimum spacing requirement $Spacing_{efffecitve}$ for the effective width $W_{effective}$. As a result, an incorrect and potentially defective result may occur if the width-based design rule is evaluated against the individual objects. By contrast, the present embodiment evaluates the width-based design rule against the collective group of objects, which serves to identify the correct spacing distance for the layout configuration.

Figure 4D:
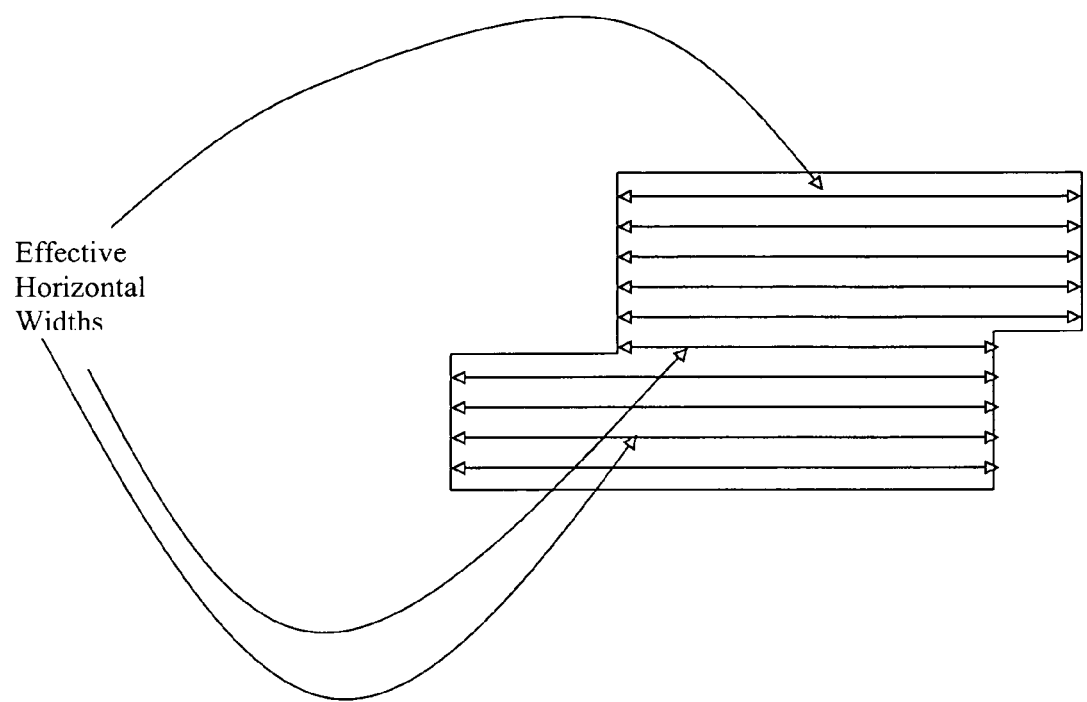

FIG. 4D illustrates the scan line approach for determining the horizontal effective width(s) of the collective object. The scan line processing identifies the horizontal width of the entire collective object at each point of the scan. In this example, it can be seen that there are three different values for the horizontal effective widths within the collective object.

Figure 5A:
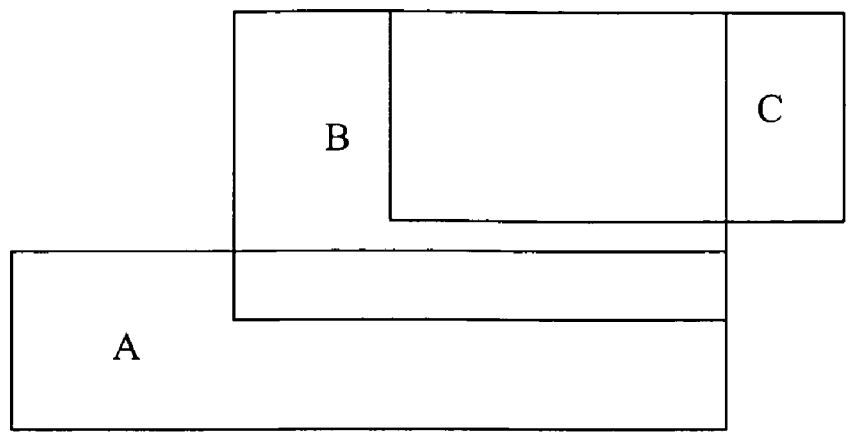
FIGS. 5A-E illustrate an alternate application of one embodiment of the invention to the configuration of FIG. 3.
Figure 5A:
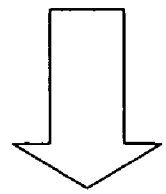
Figure 5A:
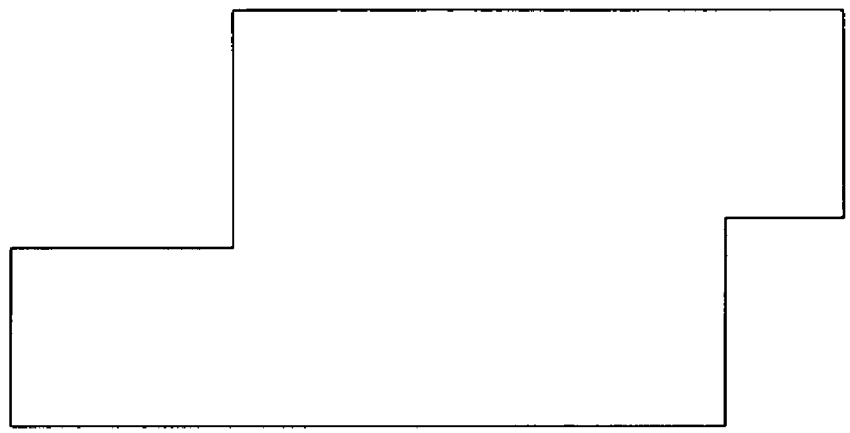

Other approaches may also be taken to determine the effective widths of the collective object for evaluation of width-based spacing rules. For example, another possible approach is to vertically and horizontally decompose the collective object into maximum-sized rectangles in the vertical and horizontal orientations. These maximum-sized rectangles are then analyzed for their widths to identify effective widths for the collective object. To illustrate, consider again the objects A, B, and C which are merged together into a collective object, e.g., using a geometric Boolean OR operation as shown in FIG. 5A.

Figure 5B:
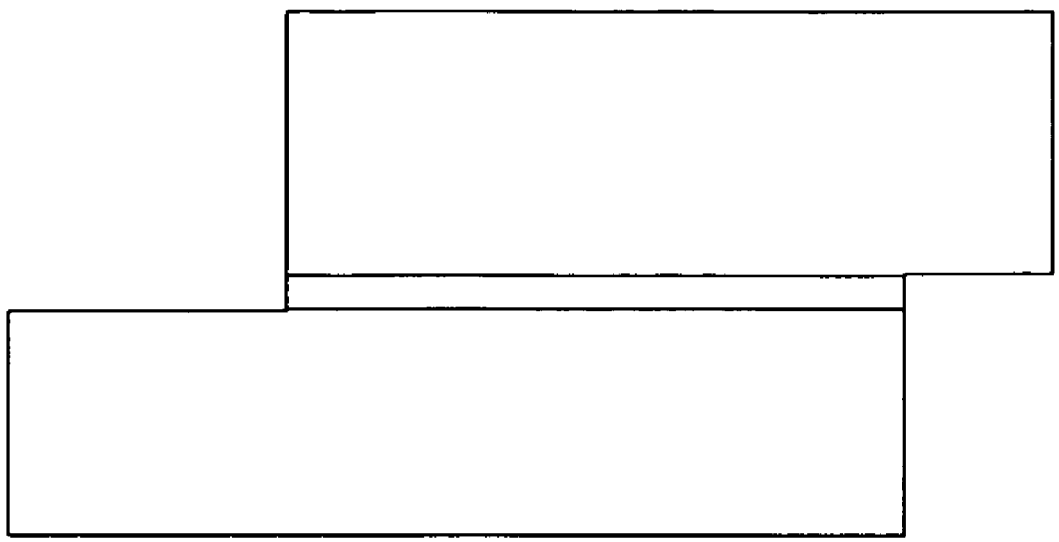

Horizontal decomposition is performed in one embodiment by identifying the minimum number of largest rectangles (having parallel edges on opposites exterior right and left hand sides) which fit within the collective object. Here, it can be seen in FIG. 5B that the horizontal decomposition process results in three rectangles that fit within the collective object. Each of these rectangles have parallel edges on opposite outside right and left edges of the collective object.

Figure 5C:
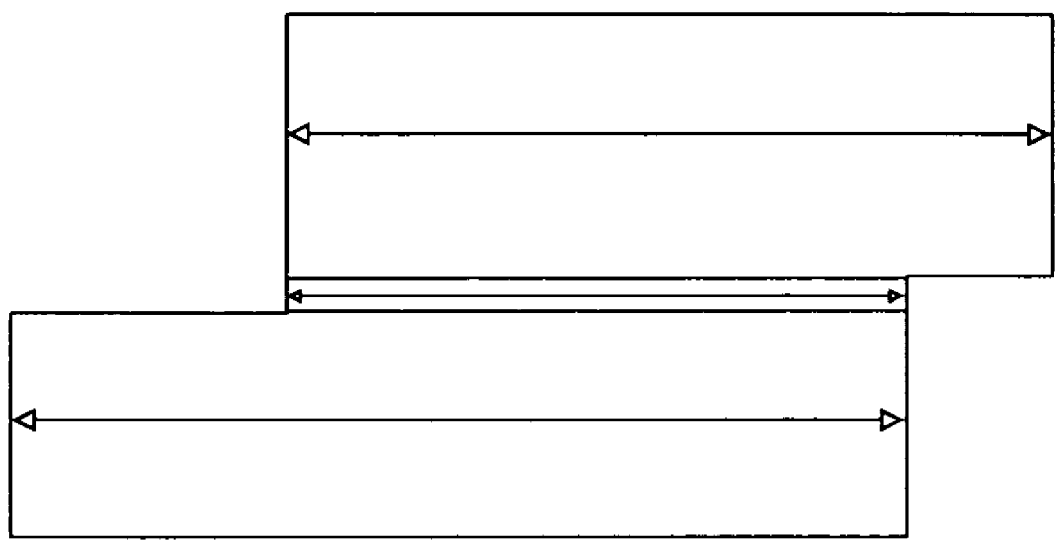

As shown in FIG. 5C, the horizontal widths of the rectangles are measured to identify the effective horizontal width (s) of the collective object. In this example, the effective horizontal widths correspond to the horizontal widths of the three rectangles that were formed by the horizontal decomposition process.

Figure 5D:
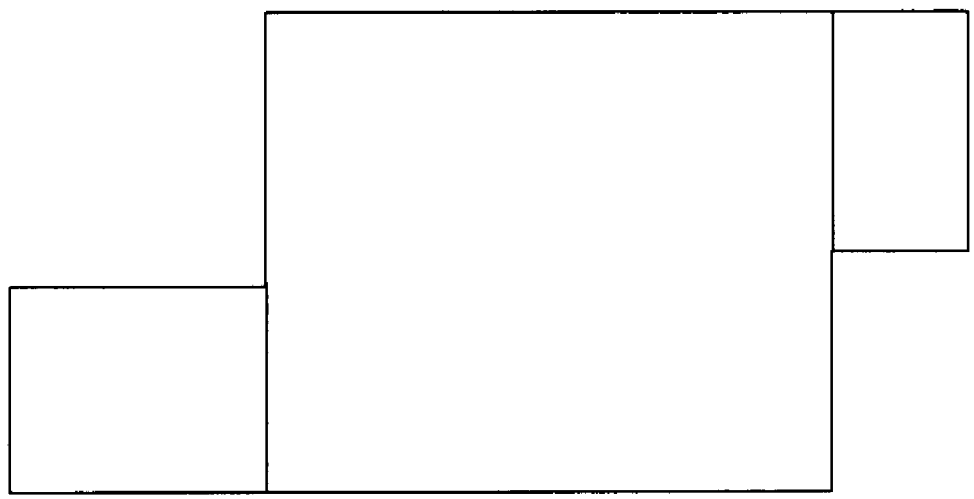

In a similar manner, vertical decomposition may be performed by identifying the minimum number of largest rectangles (having parallel edges on opposites exterior top and bottom sides) which fit within the collective object. Here, it can be seen in FIG. 5D that the vertical decomposition process results in three rectangles that fit within the collective object. Each of these rectangles have parallel edges on opposite outside top and bottom edges of the collective object.

Figure 5E:
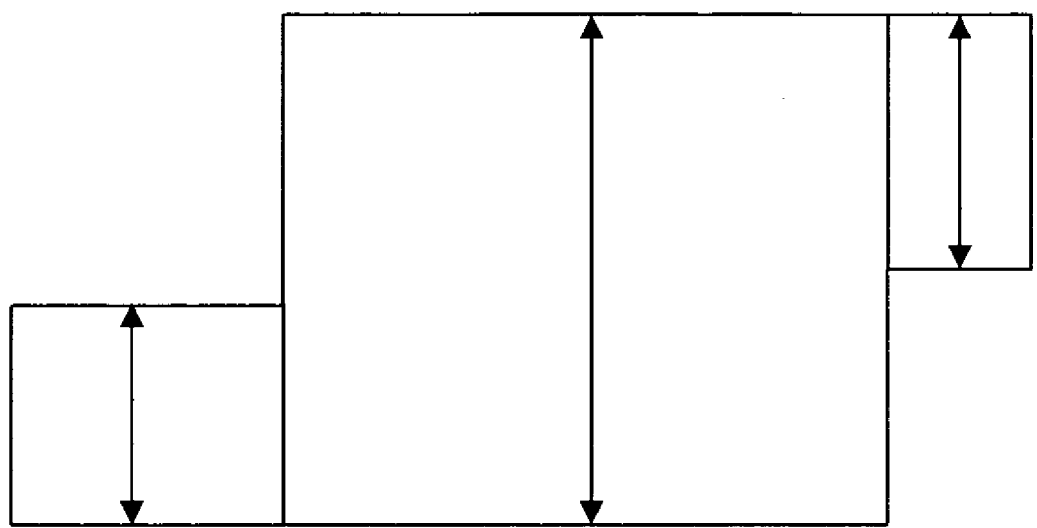

As shown in FIG. 5E, the vertical widths of the rectangles are measured to identify the effective vertical width(s) of the collective object. In this example, the effective vertical widths correspond to the vertical widths of the three rectangles that were formed by the vertical decomposition process.

Figure 6:
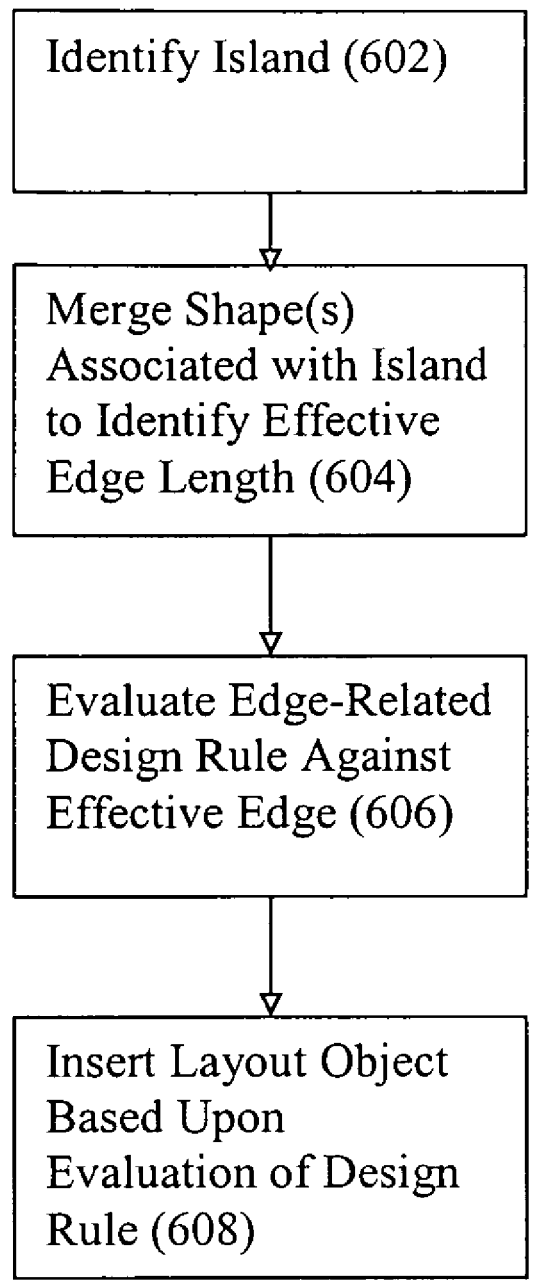
FIG. 6 shows a flowchart of a process for performing layout, placement, and/or routing with merged shapes for edge-related rules according to some embodiments of the invention.

Other types of design rules may be similarly operated upon with merged objects. As another illustrative example, FIG. 6 shows a flowchart of a process for handling edge-based rules. Examples of edge-based design rules include edge length rules, parallel run length rules, and end of line rules.

As before, an initial action is to identify one or more islands that need to be analyzed (602). The next action is to merge the objects within the island in a manner that facilitates analysis of an effective edge lengths for those objects in the island (604). The effective edge length(s) are determined for each orientation relative to the collective object from which another layout object may be placed. In some embodiments, horizontal and/or vertical effective edge lengths are determined for the collective object. Any suitable approach may be performed to identify the effective widths within the scope of the invention.

The edge-based spacing rules are evaluated against the effective edge length(s) to perform the layout analysis (606). This action may be taken for either or both placement as well as routing objects that need to be inserted into an IC design. This action identifies the type, size, configuration, and/or geometric placement of objects in the layout based upon analysis of the edge-based spacing rules. In essence, analysis is performed to ensure that the newly placed object will not violate a edge-based rule relative to the collective object. Thereafter, the layout object is inserted into the design in a manner that does not violate the edge-based design rules relative to the collective object (608).

To illustrate this embodiment of the invention, consider again the configuration of objects A, B, and C as shown in FIG. 3. Further assume that it is desired to place another spaced apart from these objects and just vertical above object B. The initial action is to identify an island of objects that should be analyzed as a collective group. Assume that the criteria for determining an island is based upon the identifying the objects that short together on a single layer, whether directly or indirectly through other objects. Here, the island consists of all three objects—object A, object B, and object C—since all three objects short together.

Figure 7A:
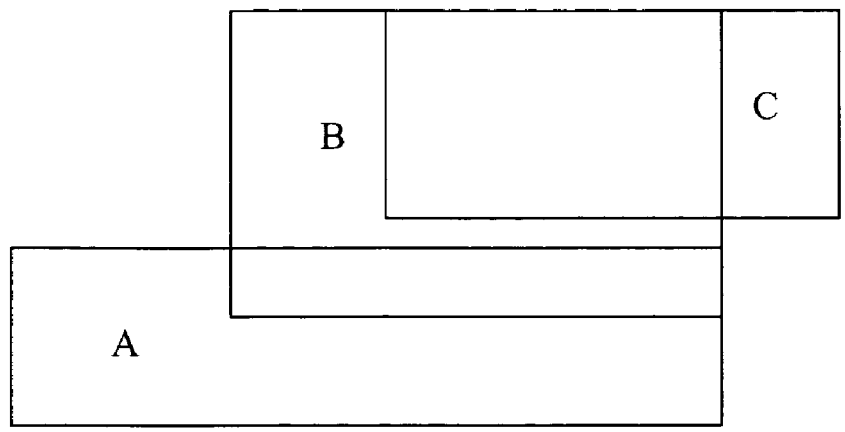
FIGS. 7A-C illustrate an application of one embodiment of the invention to the configuration of FIG. 3 for edge-related rules.
Figure 7A:
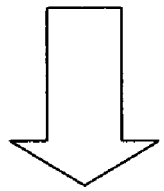
Figure 7A:
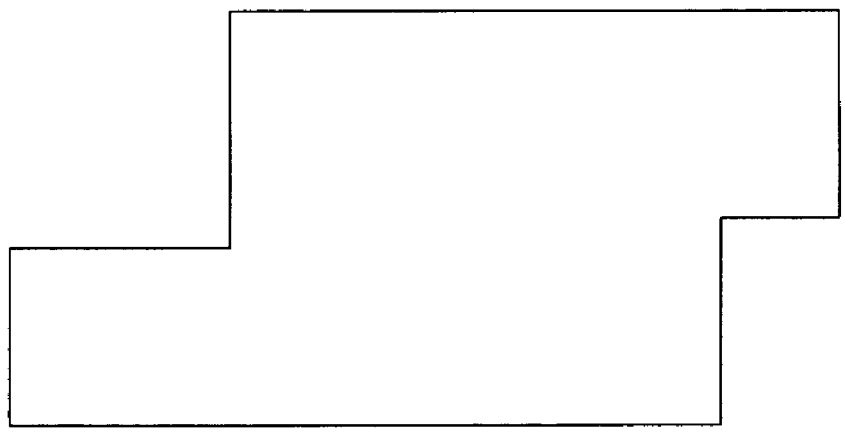

The next action is to merge the objects in the island together. As shown in FIG. 7A, one approach for merging the objects together is to perform a geometric Boolean OR operation upon the objects.

Figure 7B:
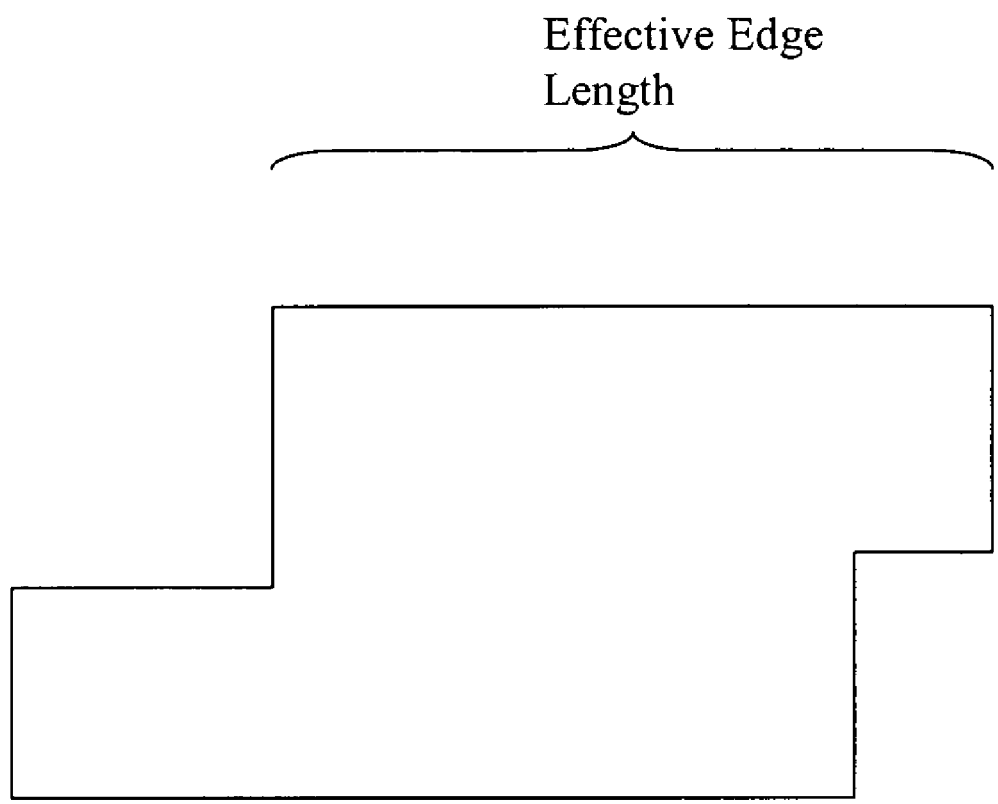

The next action is to determine the effective edge length of the object relative to the intended edge-based spacing rule and with respect to the appropriate orientation for the intended object to be placed in the layout. In this illustrative example, the process would be used to identify the effective edge length of the top edge of the collective object. FIG. 7B shows the collective top edge length of the collective object.

Figure 7C:
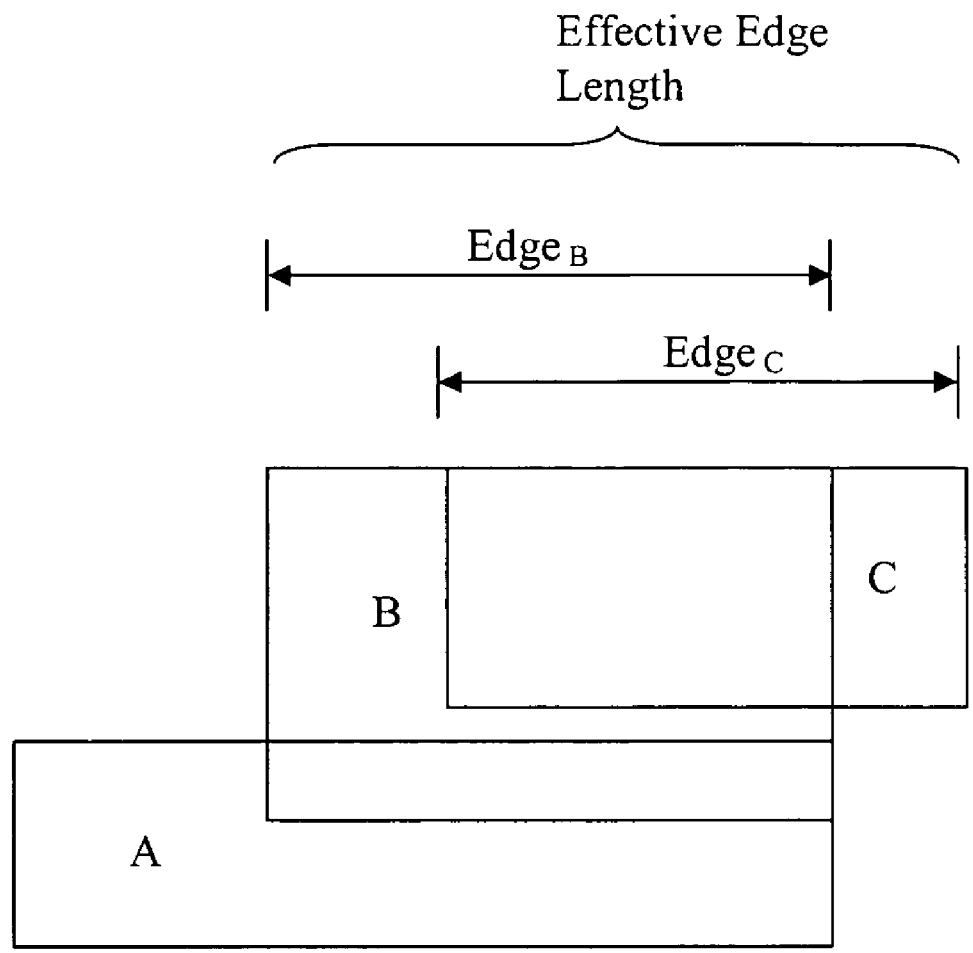

As can be seen in FIG. 7C, the effective edge length of the collective object is significantly longer than the individual edge lengths of the objects B and C. This highlights the fact that any edge-based design rules that operate against the individual objects B and C may resulting an incorrect and defective layout solution, since the effective top edge of the collective object is different from the actual top edges of objects B and C.

Therefore, the placement of any additional objects adjacent to the top edge would be analyzed relative to the effective top edge length, which will ensure appropriate compliance with the edge-based design rules and optimize yield and manufacturability of the IC design.

In some embodiments, multiple types of data representations can be generated and stored for the IC design. Example of the different data representations include a representation of the individual objects ("object view"), a representation of merged shapes ("merged view"), and a representation of edges for the collective objects ("edge view"). These data representations for merged shapes can be concurrently stored in a database system associated with the corresponding IC design.

System Architecture Overview

Figure 8:
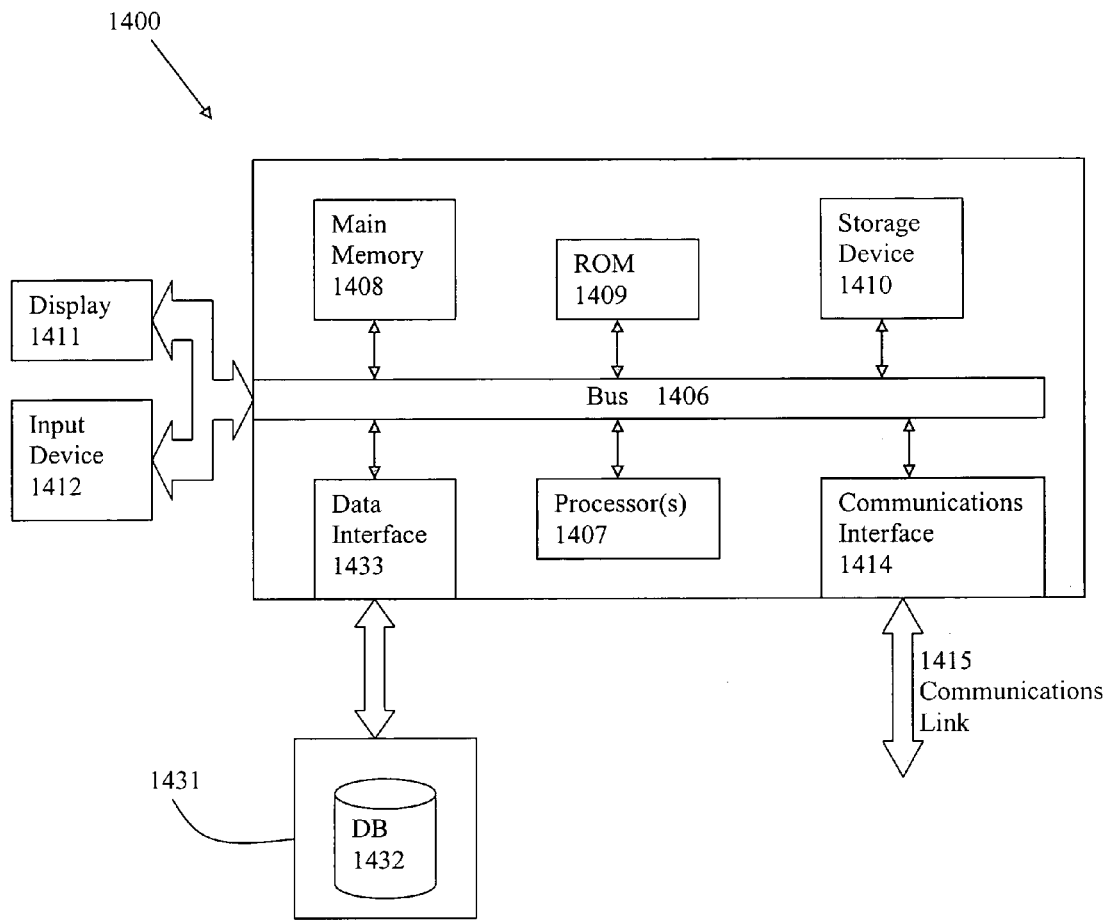
FIG. 8 illustrates an example computing architecture with which the invention may be implemented.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for designing an electronic circuit design, comprising:
   identifying an island based at least in part upon proximity of one or more objects to one or more other objects;
   merging shapes associated with the island to identify an effective width or an effective edge length, wherein
      the effective width is obtained by performing a Boolean OR to merge the shapes and then by identifying a width of interest,
      the effective edge length is obtained by performing a Boolean OR to merge the shapes and then by identifying an edge of interest, and
      the act of merging the shapes is performed by a computer processor;
   evaluating a design rule using the island against a layout object;
   inserting the layout object into the electronic circuit design based at least in part upon the analysis; and
   displaying a result of the act of inserting the layout object into the electronic circuit design on a display apparatus or storing the result on a tangible computer-usable storage medium or a storage device.

2. The method of claim 1 in which the design rule is a width-based rule or edge-based rule.

3. The method of claim 2 in which the layout object is evaluated to verify that the width-based rule or edge-based rule has not been violated.

4. The method of claim 1 in which the design rule is evaluated against the effective width.

5. The method of claim 1 in which the effective width is either a horizontal or vertical effective width.

6. The method of claim 1 in which scan lines are used to identify the width of interest.

7. The method of claim 1 in which the effective width is obtained by horizontally and vertically decomposing the island.

8. The method of claim 7 in which horizontal and vertical decomposition is performed by identifying a minimum number of large rectangles which fit in the island in the vertical and horizontal directions and determining one or more widths based upon the rectangles.

9. The method of claim 1 in which the design rule is evaluated against the effective edge length.

10. The method of claim 1 in which multiple layout representations is concurrently stored for the electronic circuit design.

11. The method of claim 10 in which the multiple layout representations comprise an object view, merged view, or edge view.

12. A method for designing an electronic circuit design, comprising:
    identifying a set of shapes to merge based at least in part upon proximity of one or more objects to one or more other objects;
    generating a merged shape based upon the set of shapes to identify an effective width or an effective edge length, wherein
       the effective width is obtained by performing a Boolean OR to merge at least some of the set of shapes and then by identifying a width of interest,
       the effective edge length is obtained by performing a Boolean OR to merge at least some of the set of shapes and then by identifying an edge of interest, and the act of generating the merged shape is performed by a computer processor;
    evaluating a design rule using the merged shapes against a layout object;
    inserting the layout object into the electronic circuit design based at least in part upon the analysis; and
    displaying a result of the act of inserting the layout object into the electronic circuit design on a display apparatus or storing the result on a tangible computer-usable storage medium or a storage device.

13. The method of claim 12 in which the design rule is a width-based rule or edge-based rule.

14. The method of claim 13 in which the layout object is evaluated to verify that the width-based rule or edge-based rule has not been violated.

15. The method of claim 12 in which the design rule is evaluated against the effective width.

16. The method of claim 12 in which the effective width is either a horizontal or vertical effective width.

17. The method of claim 12 in which scan lines are used to identify the width of interest.

18. The method of claim 12 in which the effective width is obtained by horizontally and vertically decomposing the island.

19. The method of claim 18 in which horizontal and vertical decomposition is performed by identifying a minimum number of large rectangles which fit in the island in the vertical and horizontal directions and determining one or more widths based upon the rectangles.

20. The method of claim 12 in which the design rule is evaluated against the effective edge length.

21. The method of claim 12 in which multiple layout representations is concurrently stored for the electronic circuit design.

22. The method of claim 21 in which the multiple layout representations comprise an object view, merged view, or edge view.

23. A system for designing an electronic circuit design, comprising:
    means for identifying an island based at least in part upon proximity of one or more objects to one or more other objects;
    a computer processor configured for merging shapes associated with the island to identify an effective width or an effective edge length, wherein
        the effective width is obtained by performing a Boolean OR to merge the shapes and then by identifying a width of interest, and
        the effective edge length is obtained by performing a Boolean OR to merge the shapes and then by identifying an edge of interest;
    means for evaluating a design rule using the island against a layout object;
    means for inserting the layout object into the electronic circuit design based at least in part upon the analysis; and
    a display apparatus configured for displaying a result of the act of inserting the layout object into the electronic circuit design or a tangible computer-usable storage medium or a storage device configured for storing the result.

24. A computer program product that includes a computer readable medium, the computer readable medium comprising a plurality of computer instructions which, when executed by a processor, cause the processor to execute performing a method for designing an electronic circuit design, the process comprising:
    identifying an island based at least in part upon proximity of one or more objects to one or more other objects;
    merging shapes associated with the island to identify an effective width or an effective edge length, wherein
        the effective width is obtained by performing a Boolean OR to merge the shapes and then by identifying a width of interest,
        the effective edge length is obtained by performing a Boolean OR to merge the shapes and then by identifying an edge of interest, and
        the act of merging the shapes is performed by a computer processor;
    evaluating a design rule using the island against a layout object;
    inserting the layout object into the electronic circuit design based at least in part upon the analysis; and
    displaying a result of the act of inserting the layout object into the electronic circuit design on a display apparatus or storing the result on a tangible computer-usable storage medium or a storage device.

25. A system for designing an electronic circuit design, comprising:
    means for identifying a set of shapes to merge based at least in part upon proximity of one or more objects to one or more other objects;
    a computer processor configured for generating a merged shape based upon the set of shapes to identify an effective width or an effective edge length, wherein
        the effective width is obtained by performing a Boolean OR to merge at least some of the set of shapes and then by identifying a width of interest, and
        the effective edge length is obtained by performing a Boolean OR to merge at least some of the set of shapes and then by identifying an edge of interest;
    means for evaluating a design rule using the merged shapes against a layout object;
    means for inserting the layout object into the electronic circuit design based at least in art upon the analysis; and
    a display apparatus configured for displaying a result of the act of inserting the layout object into the electronic circuit design or a tangible computer-usable storage medium or a storage device configured for storing the result.

26. A computer program product that includes a computer readable medium, the computer readable medium comprising a plurality of computer instructions which, when executed by a processor, cause the processor to execute performing a process for designing an electronic circuit design, the process comprising:
    identifying a set of shapes to merge based at least in part upon proximity of one or more objects to one or more other objects;
    generating a merged shape based upon the set of shapes to identify an effective width or an effective edge length, wherein
        the effective width is obtained by performing a Boolean OR to merge at least some of the set of shapes and then by identifying a width of interest,
        the effective edge length is obtained by performing a Boolean OR to merge at least some of the set of shapes and then by identifying an edge of interest, and the act of generating the merged shape is performed by a computer processor;
    evaluating a design rule using the merged shape against a layout object;
    inserting the layout object into the electronic circuit design based at least in part upon a the analysis; and
    displaying a result of the act of inserting the layout object into the electronic circuit design on a display apparatus or storing the result on a tangible computer-usable storage medium or a storage device.

* * * * *